(12) United States Patent
Gaal et al.

(10) Patent No.: US 9,025,479 B2
(45) Date of Patent: May 5, 2015

(54) INCREASING CSI-RS OVERHEAD VIA ANTENNA PORT AUGMENTATION

(71) Applicant: QUALCOMM Incorporated, San Diego, CA (US)

(72) Inventors: Peter Gaal, San Diego, CA (US); Tingfang Ji, San Diego, CA (US); Alan Barbieri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 134 days.

(21) Appl. No.: 13/633,836

(22) Filed: Oct. 2, 2012

(65) Prior Publication Data

US 2013/0100834 A1    Apr. 25, 2013

Related U.S. Application Data

(60) Provisional application No. 61/542,766, filed on Oct. 3, 2011.

(51) Int. Cl.
*H04W 24/02*    (2009.01)
*H04L 5/00*    (2006.01)

(52) U.S. Cl.
CPC .............. *H04W 24/02* (2013.01); *H04L 5/005* (2013.01); *H04L 5/0094* (2013.01)

(58) Field of Classification Search
None
See application file for complete search history.

(56) References Cited

U.S. PATENT DOCUMENTS

| | | | |
|---|---|---|---|
| 8,208,434 B2 * | 6/2012 | Sayana et al. ................ | 370/329 |
| 8,305,987 B2 * | 11/2012 | Fong et al. ................... | 370/329 |
| 8,494,006 B2 * | 7/2013 | Lee et al. ...................... | 370/482 |
| 8,542,763 B2 * | 9/2013 | Forenza et al. ............... | 375/267 |
| 8,654,734 B2 * | 2/2014 | Chandrasekhar et al. .... | 370/330 |
| 8,654,815 B1 * | 2/2014 | Forenza et al. ............... | 375/141 |
| 8,681,651 B2 * | 3/2014 | Bhattad et al. ............... | 370/252 |
| 2010/0272032 A1 * | 10/2010 | Sayana et al. ................ | 370/329 |
| 2010/0323684 A1 * | 12/2010 | Cai et al. ................... | 455/422.1 |
| 2011/0170435 A1 * | 7/2011 | Kim et al. ..................... | 370/252 |
| 2011/0194551 A1 * | 8/2011 | Lee et al. ...................... | 370/342 |
| 2011/0199986 A1 * | 8/2011 | Fong et al. .................... | 370/329 |
| 2011/0228735 A1 * | 9/2011 | Lee et al. ...................... | 370/329 |
| 2011/0235608 A1 * | 9/2011 | Koo et al. ..................... | 370/329 |
| 2011/0235743 A1 * | 9/2011 | Lee et al. ...................... | 375/295 |
| 2012/0033643 A1 * | 2/2012 | Noh et al. ..................... | 370/335 |
| 2012/0113816 A1 * | 5/2012 | Bhattad et al. ............... | 370/246 |
| 2012/0176939 A1 | 7/2012 | Qu et al. | |
| 2012/0176965 A1 * | 7/2012 | Zhu et al. ..................... | 370/328 |

(Continued)

OTHER PUBLICATIONS

ZTW: "Remaining Issues of CSI Feedback", 3GPP Draft; R1-110174, 3rd Generation Partnership Project (3GPP), Mobile Competence Centre ; 650, Route Des Lucioles ; F-06921 Sophia-Antipolis Cedex ; France, vol. RAN WG1, no. Dublin, Ireland; 20110117, Jan. 13, 2011, XP050490359, [retrieved on Jan. 13, 2011].*

(Continued)

*Primary Examiner* — Ayaz Sheikh
*Assistant Examiner* — Faiyazkhan Ghafoerkhan
(74) *Attorney, Agent, or Firm* — Seyfarth Shaw LLP

(57) ABSTRACT

A method of wireless communication is presented. The method includes signaling a first number of channel state information-reference signal (CSI-RS) ports corresponding to resource elements (REs) and a second number of virtual antenna ports, the second number being less than or equal to the first number. The method also includes transmitting CSI-RS on each virtual antenna port, the CSI-RS mapped to at least a portion of the REs.

26 Claims, 12 Drawing Sheets

(56) References Cited

U.S. PATENT DOCUMENTS

| | | | |
|---|---|---|---|
| 2012/0213167 A1* | 8/2012 | Xu et al. | 370/329 |
| 2012/0281554 A1* | 11/2012 | Gao et al. | 370/252 |
| 2012/0281567 A1* | 11/2012 | Gao et al. | 370/252 |
| 2013/0028180 A1* | 1/2013 | Gao et al. | 370/328 |
| 2013/0051240 A1* | 2/2013 | Bhattad et al. | 370/241 |

OTHER PUBLICATIONS

Catt: "UE capability for DL and UL MIMO in Rel-10", 3GPP Draft; R1-110512, 3rd Generation Partnership Project (3GPP), Mobile Competence Centre ; 650, Route Des Lucioles ; F-06921 Sophia-Antipolis Cedex ; France, vol. RAN WG1, no. Dublin, Ireland; 20110117, Jan. 14, 2011, XP050490401, [retrieved on Jan. 14, 2011].

Dahlman Erik et al., "4G LTE/LTE-Advanced for Mobile Broadband—Chapter 10", Mar. 29, 2011, pp. 145-202, XP055046016.

Fujitsu: "CSI-RS Design for Virtualized LTE Antenna in LTE-A System", 3GPP Draft; R1-093152, 3rd Generation Partnership Project (3GPP), Mobile Competence Centre; 650, Route Des Lucioles; F-06921 Sophia-Antipolis Cedex; France, no. Shenzhen, China; 20090818, Aug. 18, 2009, XP050351511, [retrieved on Aug. 18, 2009].

International Search Report and Written Opinion—PCT/US2012/000451—ISA/EPO—Feb. 25, 2013.

ZTE: "Remaining Issues of CSI Feedback", 3GPP Draft; R1-110174, 3rd Generation Partnership. Project (3GPP), Mobile Competence Centre ; 650, Route Des Lucioles ; F-06921 Sophia-Antipolis Cedex ; France, vol. RAN WG1, no. Dublin, Ireland; 20110117, Jan. 13, 2011, XP050490359, [retrieved on Jan. 13, 2011].

* cited by examiner

INCREASING CSI-RS OVERHEAD VIA ANTENNA PORT AUGMENTATION

CROSS-REFERENCE TO RELATED APPLICATION

This application claims the benefit under 35 U.S.C. §119(e) to U.S. Provisional Patent Application No. 61/542,766 entitled "INCREASING CHANNEL STATE INFORMATION-REFERENCE SIGNAL OVERHEAD THROUGH ANTENNA PORTS AUGMENTATION," filed on Oct. 3, 2011, the disclosure of which is expressly incorporated by reference herein in its entirety.

BACKGROUND

1. Field

Aspects of the present disclosure relate generally to wireless communication systems, and more particularly to increasing channel state information-reference signal (CSI-RS) overhead via antenna port augmentation.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

SUMMARY

According to an aspect of the present disclosure, a method of wireless communication is presented. The method includes signaling a first number of channel state information-reference signal (CSI-RS) ports corresponding to resource elements (REs). The method also includes signaling a second number of virtual antenna ports, the second number being less than or equal to the first number. The method further includes transmitting CSI-RS on each virtual antenna port, the CSI-RS mapped to at least a portion of the REs.

According to another aspect, a method of wireless communication is presented. The method includes receiving a first number of CSI-RS ports corresponding to REs. The method also includes. The method also includes receiving a second number of virtual antenna ports, the second number being less than or equal to the first number. The method further includes receiving CSI-RS on each virtual antenna port, the CSI-RS mapping to at least a portion of the REs.

According to yet another aspect, an apparatus for wireless communication is presented. The apparatus includes means for signaling a first number of CSI-RS ports corresponding to REs. The apparatus also includes means for signaling a second number of virtual antenna ports, the second number being less than or equal to the first number. The apparatus further includes means for transmitting CSI-RS on each virtual antenna port, the CSI-RS mapped to at least a portion of the REs.

According to still yet another aspect, an apparatus for wireless communication is presented. The apparatus includes means for receiving a first number of CSI-RS ports corresponding to REs. The apparatus also includes means for receiving a second number of virtual antenna ports, the second number being less than or equal to the first number. The apparatus further includes means for receiving CSI-RS on each virtual antenna port, the CSI-RS mapping to at least a portion of the REs.

According to another aspect, a computer program product for wireless communication in a wireless network. The computer program product includes a non-transitory computer-readable medium having non-transitory program code recorded thereon. The program code includes program code to signal a first number of CSI-RS ports corresponding to REs. The program code also includes program code to signal a second number of virtual antenna ports, the second number being less than or equal to the first number. The program code further includes program code to transmit CSI-RS on each virtual antenna port, the CSI-RS mapped to at least a portion of the REs.

According to yet another aspect, computer program product for wireless communication in a wireless network is presented. The computer program product includes a non-transitory computer-readable medium having non-transitory program code recorded thereon. The program code includes program code to receive a first number of channel state information-reference signal (CSI-RS) ports corresponding to resource elements (REs). The program code also includes program code to receive a second number of virtual antenna ports, the second number being less than or equal to the first number. The program code further includes program code to receive CSI-RS on each virtual antenna port, the CSI-RS mapping to at least a portion of the REs.

According to still yet another aspect, an apparatus for wireless communication is presented. The apparatus includes a memory and at least one processor coupled to the memory. The processor(s) is configured to signal a first number of channel state information-reference signal (CSI-RS) ports corresponding to resource elements (REs). The processor(s) also being configured to signal a second number of virtual antenna ports, the second number being less than or equal to the first number. The processor(s) further being configured to transmit CSI-RS on each virtual antenna port, the CSI-RS mapped to at least a portion of the REs.

According to another aspect, an apparatus for wireless communication is presented. The apparatus includes a memory and at least one processor coupled to the memory. The processor(s) is configured to receive a first number of channel state information-reference signal (CSI-RS) ports corresponding to resource elements (REs). The processor(s) is also configured to receive a second number of virtual antenna ports, the second number being less than or equal to the first number. The processor(s) is further configured to receive CSI-RS on each virtual antenna port, the CSI-RS mapping to at least a portion of the REs.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
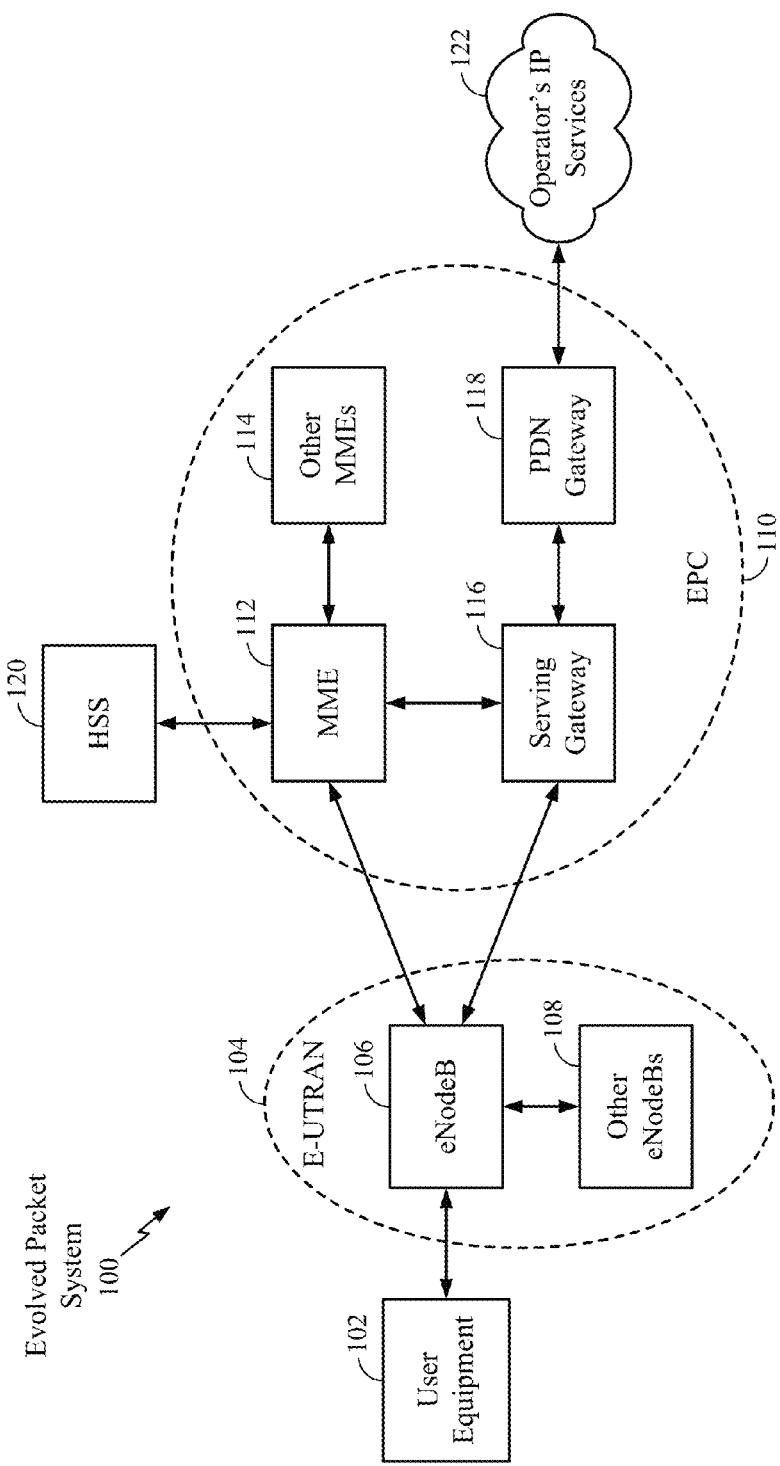
FIG. 1 is a diagram illustrating an example of a network architecture.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Aspects of the telecommunication systems are presented with reference to various apparatus and methods. These apparatus and methods are described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity, those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNodeB) 106 and other eNodeBs 108. The eNodeB 106 provides user and control plane protocol terminations toward the UE 102. The eNodeB 106 may be connected to the other eNodeBs 108 via a backhaul (e.g., an X2 interface). The eNodeB 106 may also be referred to as a base station, a base transceiver station, a radio base station, a radio transceiver, a transceiver function, a basic service set (BSS), an extended service set (ESS), or some other suitable terminology. The eNodeB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 106 is connected to the EPC 110 via, e.g., an S1 interface. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
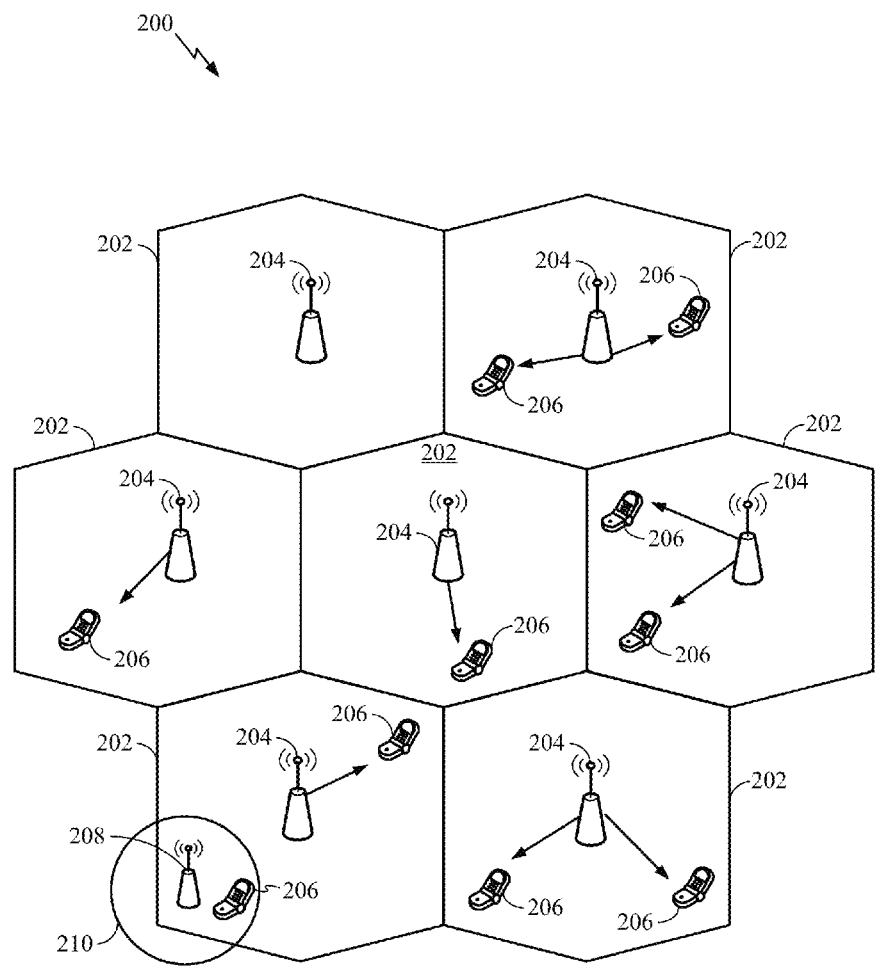
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNodeBs 208 may have cellular regions 210 that overlap with one or more of the cells 202. The lower power class eNodeB 208 may be a remote radio head (RRH), a femto cell (e.g., home eNodeB (HeNodeB)), pico cell, or micro cell. The macro eNodeBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNodeBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the downlink and SC-FDMA is used on the uplink to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeBs 204 may have multiple antennas supporting MIMO technology. The use of MIMO technology enables the eNodeBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 206 with different spatial signatures, which enables each of the UE(s) 206 to recover the one or more data streams destined for that UE 206. On the uplink, each UE 206 transmits a spatially precoded data stream, which enables the eNodeB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PAPR).

Figure 3:
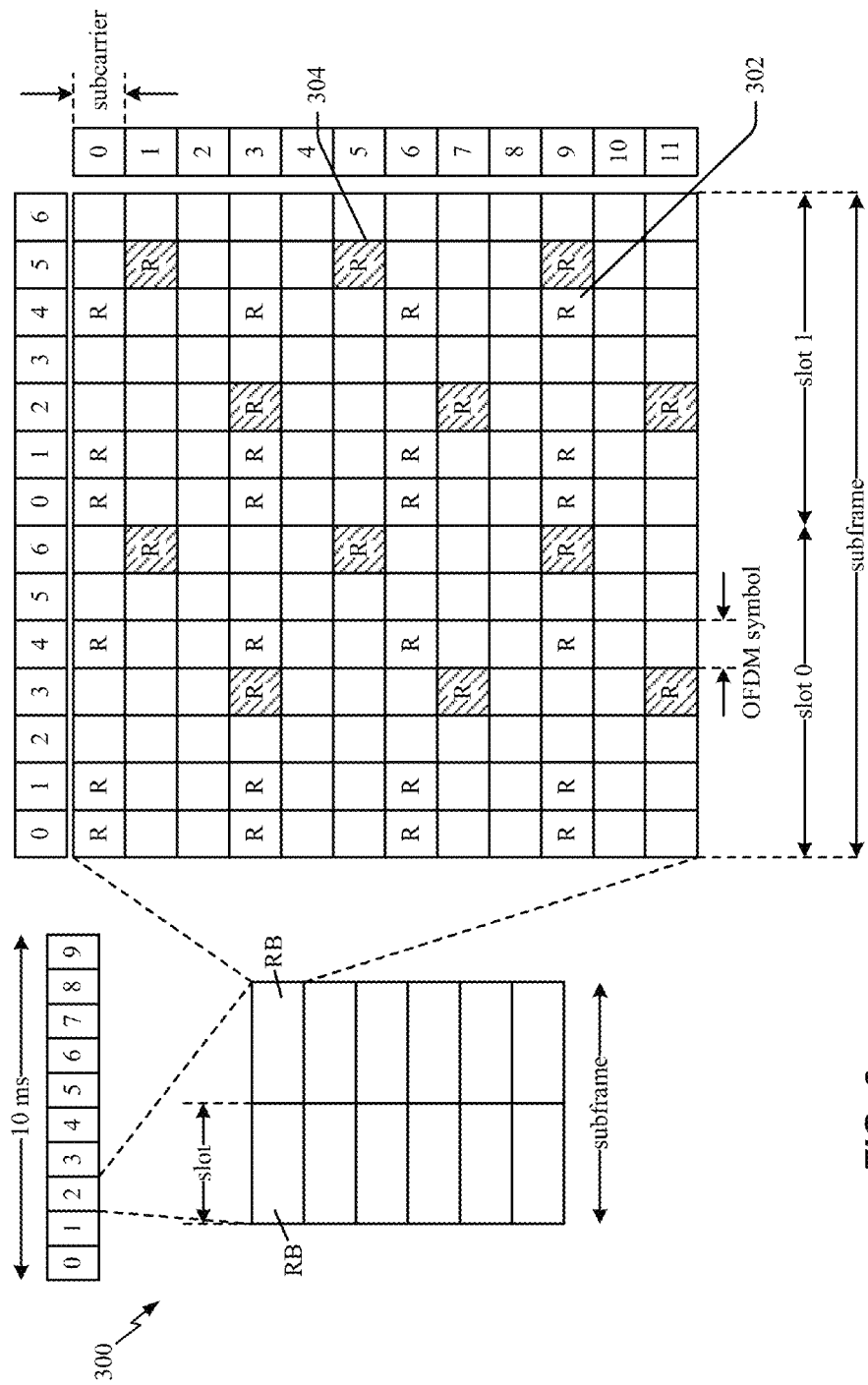
FIG. 3 is a diagram illustrating an example of a downlink frame structure in LTE.

FIG. 3 is a diagram 300 illustrating an example of a downlink frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include downlink reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 4:
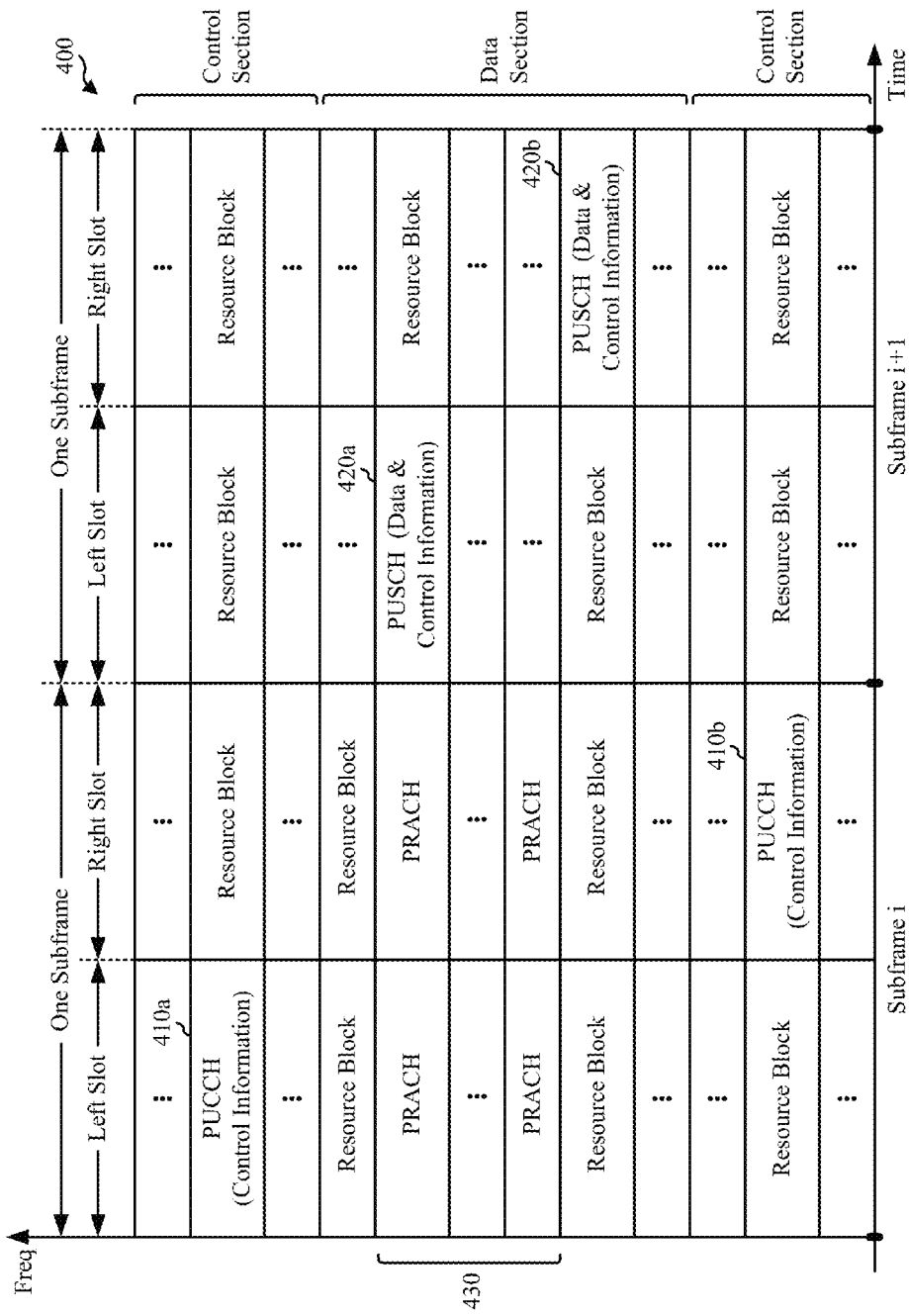
FIG. 4 is a diagram illustrating an example of an uplink frame structure in LTE.

FIG. 4 is a diagram 400 illustrating an example of an uplink frame structure in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The uplink frame structure results in the data section including contiguous subcarriers, which may allow a single UE to be assigned all of the contiguous subcarriers in the data section.

A UE may be assigned resource blocks 410a, 410b in the control section to transmit control information to an eNodeB. The UE may also be assigned resource blocks 420a, 420b in the data section to transmit data to the eNodeB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. An uplink transmission may span both slots of a subframe and may hop across frequency.

A set of resource blocks may be used to perform initial system access and achieve uplink synchronization in a physical random access channel (PRACH) 430. The PRACH 430 carries a random sequence and cannot carry any uplink data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
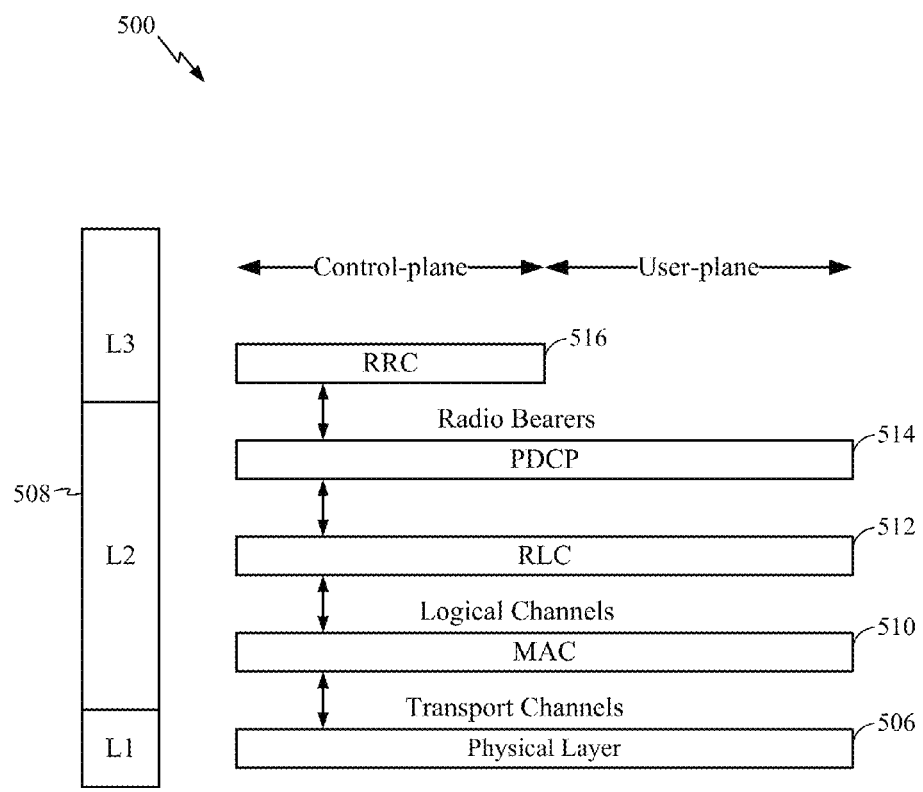
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNodeB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNodeB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNodeB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNodeBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNodeB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNodeB and the UE.

Figure 6:
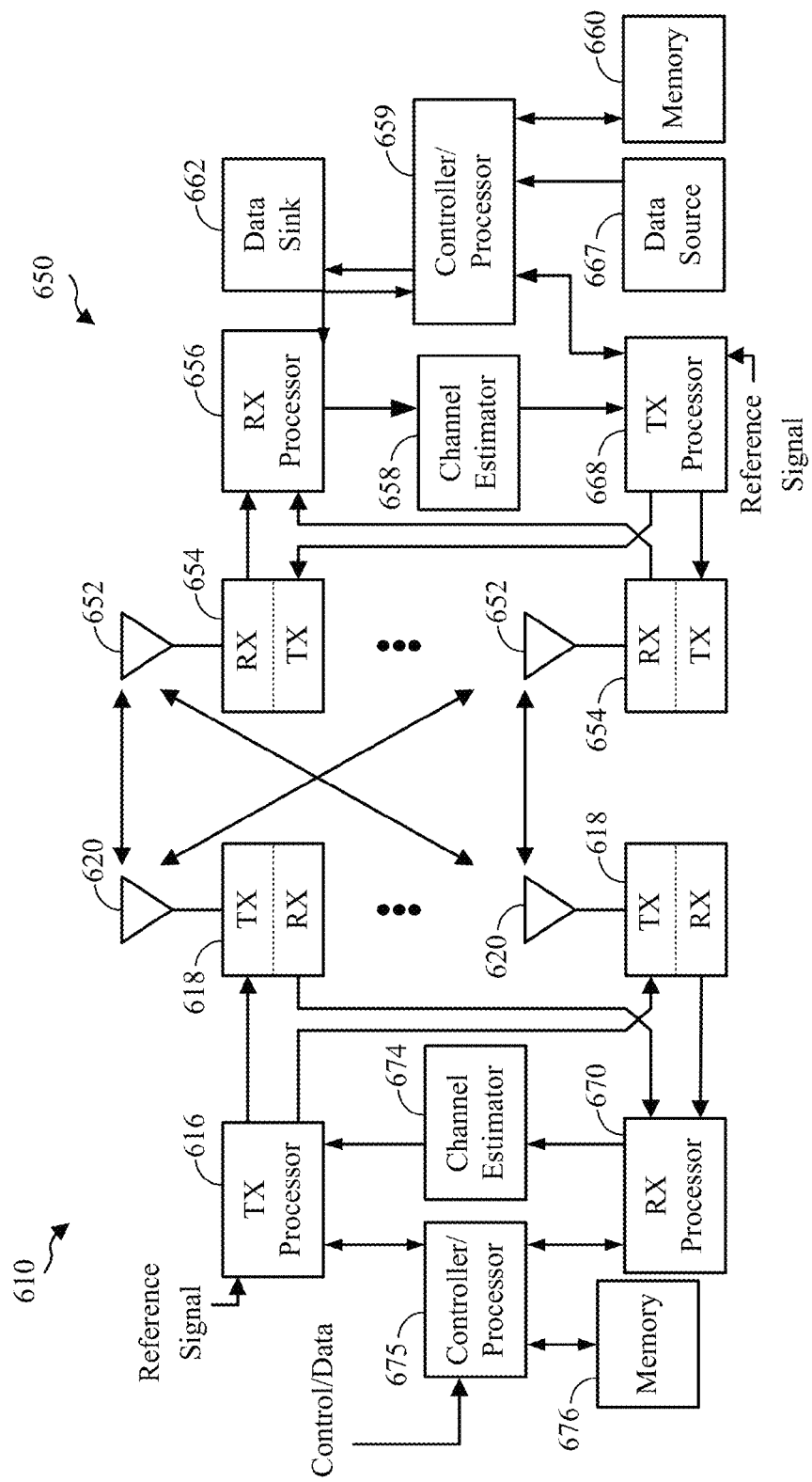
FIG. 6 is a diagram illustrating an example of an evolved Node B and user equipment in an access network.

FIG. 6 is a block diagram of an eNodeB 610 in communication with a UE 650 in an access network. In the downlink, upper layer packets from the core network are provided to a controller/processor 675. The controller/processor 675 implements the functionality of the L2 layer. In the downlink, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNodeB 610. These soft decisions may be based on channel estimates computed by the channel estimator 658. The soft decisions are then decoded and deinterleaved to recover the data and control signals that were originally transmitted by the eNodeB 610 on the physical channel. The data and control signals are then provided to the controller/processor 659.

The controller/processor 659 implements the L2 layer. The controller/processor 659 can be associated with a memory 660 that stores program codes and data. The memory 660 may be referred to as a computer-readable medium. In the uplink, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the uplink, a data source 667 is used to provide upper layer packets to the controller/processor 659. The data source 667 represents all protocol layers above the L2 layer. Similar to the functionality described in connection with the downlink transmission by the eNodeB 610, the controller/processor 659 implements the L2 layer for the user plane and the control plane by providing header compression, ciphering, packet segmentation and reordering, and multiplexing between logical and transport channels based on radio resource allocations by the eNodeB 610. The controller/processor 659 is also responsible for HARQ operations, retransmission of lost packets, and signaling to the eNodeB 610.

Channel estimates derived by a channel estimator 658 from a reference signal or feedback transmitted by the eNodeB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The uplink transmission is processed at the eNodeB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the uplink, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Increasing CSI-RS Overhead Via Antenna Port Augmentation

In LTE Release 8, 9, and 10, channel state information-reference signal (CSI-RS) overhead is maintained at a low level. That is, in each of the subframes that transmit CSI-RS, one resource element (RE) per resource block is associated with an antenna port for each CSI-RS configuration.

Figure 7:
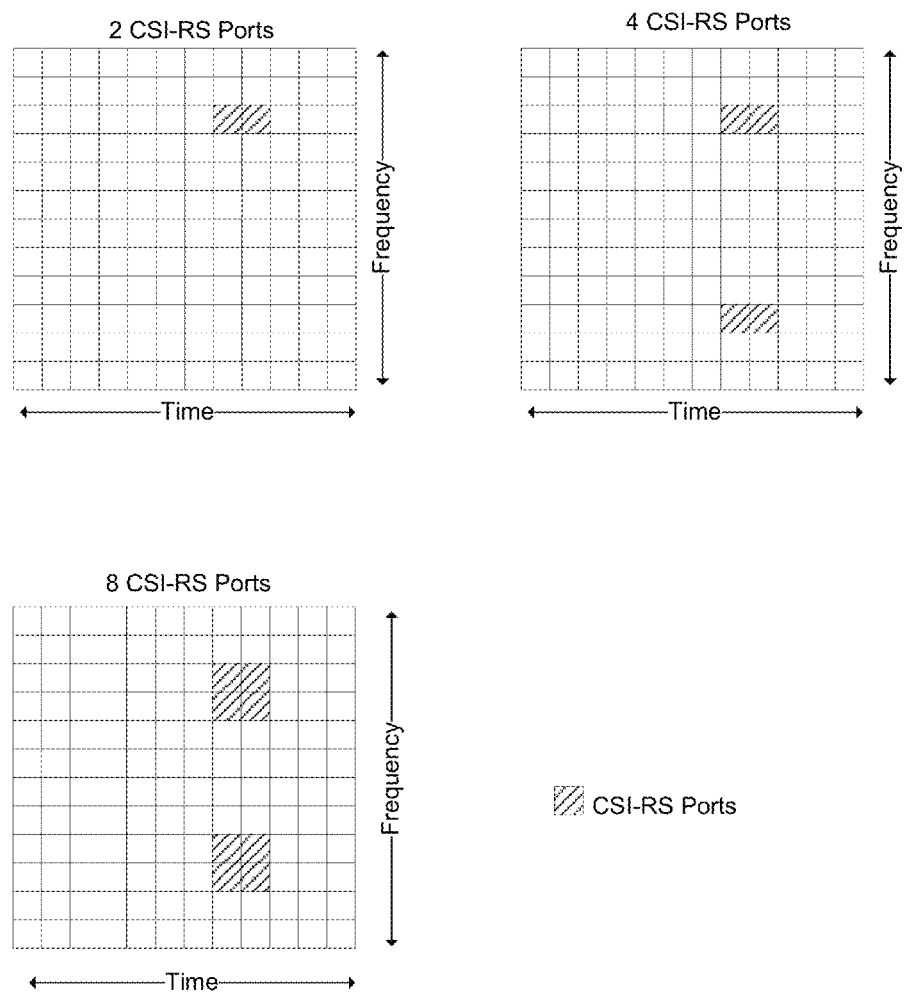
FIG. 7 is a block diagram illustrating examples of CSI-RS allocation in a conventional LTE system.

The CSI-RS patterns defined for LTE Release 8, 9, and 10 are shown in FIG. 7. As shown in FIG. 7, the X-axis designates time and the Y-axis designates frequency. Each block corresponds to a resource element and the hatched resource elements are allocated to the CSI-RS antenna ports. Furthermore, as shown in FIG. 7, two resource elements are allocated to the CSI-RS antenna ports when the eNodeB designates two CSI-RS antenna ports. Moreover, four resource elements are allocated to the CSI-RS antenna ports when the eNodeB designates four CSI-RS antenna ports and eight resource elements are allocated to the CSI-RS antenna ports when the eNodeB designates eight CSI-RS antenna ports.

The CSI-RS overhead of conventional LTE systems may not be desirable in some scenarios. For example, when performing CSI-RS interference cancellation (CSI-RS-IC), a UE may determine an estimate of the fading channel from the interferer. If the channel estimation is below a threshold, i.e., not accurate, the performance of interference cancellation may be decreased. The conventional CSI-RS overhead provides for a channel estimation that is below a threshold for providing reliable CSI-RS interference cancellation.

Furthermore, reliable channel estimation of the interference covariance matrix specifies a greater amount of CSI-RS averaging in comparison to the averaging specified for a typical channel estimation. Thus, the number of resource elements allocated to CSI-RS for each slot in a conventional LTE system may not be adequate for providing a reliable channel estimate. Therefore, it is desirable to provide CSI-RS configurations with an increased overhead for the UE to improve channel estimations.

Typically, the number of resource elements for each CSI-RS configuration depends on the number of CSI-RS antenna ports specified by the eNodeB. The number of antenna ports specified by the eNodeB may be different from the number of physical antennas and/or the number of CRS antenna ports. According to an aspect of the present disclosure, the eNodeB may increase the number of CSI-RS antenna ports declared to increase the available CSI-RS resource elements.

In one aspect of the present disclosure, the eNodeB may declare multiple CSI-RS antenna ports so that the number of declared CSI-RS antenna ports is greater than the number of physical antennas. For example, the eNodeB may declare eight CSI-RS antenna ports, which is the maximum number of antenna ports according to the LTE Release 10 specification. In this example, as a result of declaring the maximum number of CSI-RS antenna ports according to the LTE standard, more resource elements may be allocated for the CSI-RS.

The eNodeB may transmit antenna information to the UE via a signal, such as a radio resource control (RRC) signal. The antenna information may inform the UE of the number of CSI-RS antenna ports and the number of virtual antenna ports to be assumed by the UE for channel estimation. The virtual antenna ports may be equal to or less than the total number of CSI-RS antenna ports. LTE Release 10 specifies an information element for informing the UE of the number of CSI-RS antenna ports. Thus, according to an aspect, an additional information element may be specified for informing the UE of the virtual antenna port information.

The eNodeB transmits the CSI-RS on the virtual antenna ports. Therefore, the eNodeB and UE agree to a mapping between the CSI-RS antenna ports and the virtual antenna ports. The mapping may be agreed via rules specified in the standard. The resource elements associated with each virtual antenna port will all have the same CSI-RS information. Therefore, the UE may use the mapping to determine how many resource elements will be allocated to the identical CSI-RS information. That is, the UE determines the correlation between the resource elements and the virtual antenna ports.

For example, when an eNodeB specifies two virtual antenna ports and eight CSI-RS antenna ports, the first virtual antenna port may be mapped to the even-numbered CSI-RS antenna ports and the second virtual antenna port may be mapped to the odd-numbered CSI-RS antenna ports. Because the eNodeB transmits the CSI-RS via the virtual antenna ports, in the present example, the UE may receive four of the same CSI-RSs on each of the two virtual ports.

In the present disclosure, an advanced UE may perform channel estimation and/or measure interference via the joint processing of resource elements allocated to different CSI-RS antenna ports mapped to the same virtual antenna port. Because all CSI-RS resource elements of a virtual port carry identical information, the UE may use all of the resource elements to increase the reliability of the channel estimation and/or interference measurements. Joint processing may refer to averaging resource elements or increasing frequency and/or time resolution. Alternatively, joint processing may also refer to a statistical function for processing multiple resource elements to perform channel and/or interference estimations. The increase in frequency or time resolution may be limited because an increased processing gain is specified to facilitate CRS-IC.

When the CSI evaluations are based on the CSI-RS, the UE assumes that the number of antennas is equal to the number of virtual antenna ports. Furthermore, the CSI may include a pre-coding matrix index (PMI) based on a codebook associated with the number of virtual antenna ports.

Legacy UEs may still use the same CSI-RS resources. Still, the eNodeB may signal different configurations to the legacy UEs. In some cases, the legacy UE may receive a configuration for CSI-RS antenna ports and another configuration for a muting pattern. As an example, the eNodeB may specify two virtual antenna ports and eight CSI-RS antenna ports. In this example, the legacy UE may receive signaling for two CSI-RS ports and an overlapping eight CSI-RS muting pattern. The muting pattern is based on the CSI-RS ports. Thus, the legacy UE may perform channel estimation based on the two CSI-RS ports. Still, the legacy UE may not use resource element averaging or enhanced interference estimation for the channel estimation.

Although CSI-RS is primarily associated with transmission mode 9, aspects of the present disclosure are also contemplated for a UE configured with transmission modes 1, 2, 3, 4, 5, 6, 7, and 8, while also being configured to use CSI-RS for channel estimation and/or CSI-RS resources for interference estimation. It should be noted that LTE Releases 8,9, and 10 specify for transmission modes 1, 2, 3, 4, 5, 6, 7, 8 to use CRS-based channel and/or interference estimation. Thus, the aspects of the present disclosure may not be compatible with conventional LTE systems.

Figure 8A:
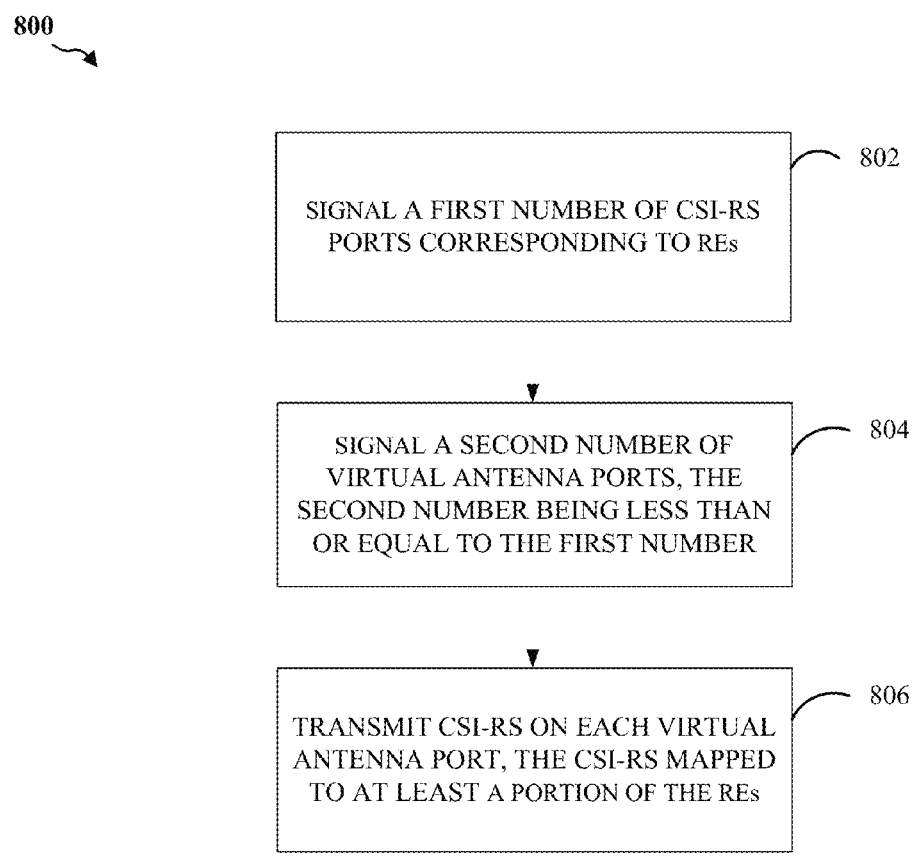
FIGS. 8A and 8B are block diagrams illustrating methods for increasing CSI-RS overhead via antenna port augmentation.

FIG. 8A illustrates a method 800 for increasing CSI-RS overhead via antenna port augmentation. In block 802, a base station signals a first number of CSI-RS ports corresponding to the resource elements (REs). The base station signals a second number of virtual antenna ports, the second number is less than or equal to the first number, in block 804. Furthermore, the base station transmits CSI-RS on each virtual antenna port, where the CSI-RS is mapped to at least a portion of the REs, in block 806.

Figure 8B:
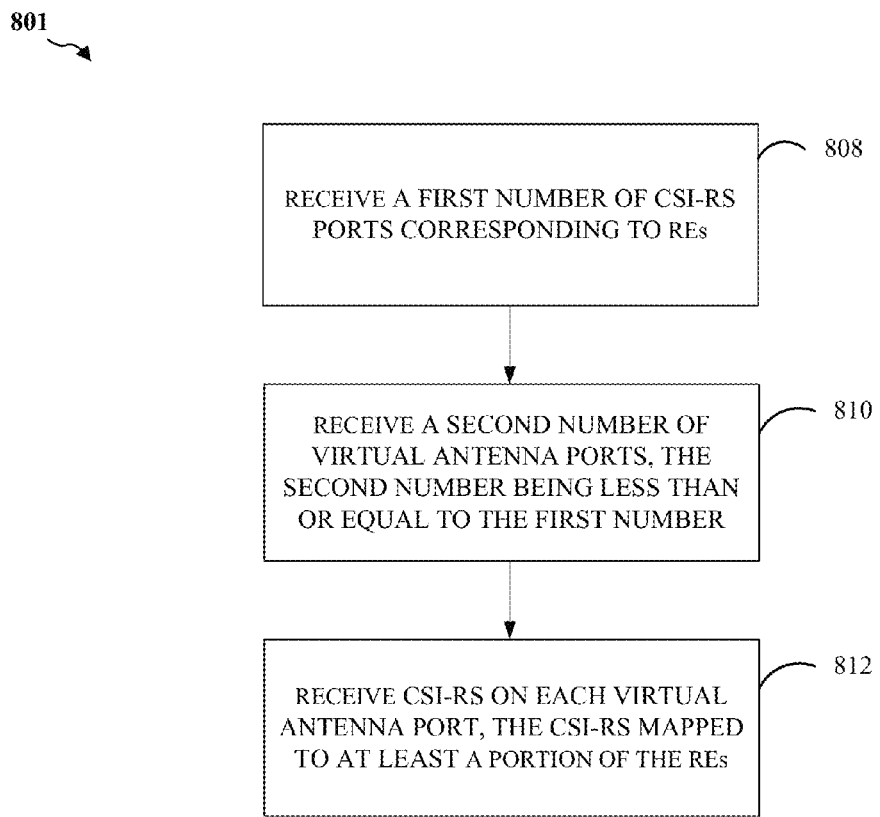

FIG. 8B illustrates a method 801 for increasing CSI-RS overhead via antenna port augmentation. In block 808, a mobile station receives a first number of CSI-RS ports corresponding to the resource elements (REs). The mobile station receives a second number of virtual antenna ports, the second number being less than or equal to the first number, in block 810. Furthermore, the mobile station receives CSI-RS on each virtual antenna port, the CSI-RS mapping to at least a portion of the REs, in block 812.

In one configuration, the eNodeB 610 is configured for wireless communication including means for signaling and means for transmitting. In one aspect, the signaling and transmitting means may be the controller/processor 675, transmit processor 616, modulators 618, and antenna 620 configured to perform the functions recited by the signaling means and transmitting means. In another aspect, the aforementioned means may be any module or any apparatus configured to perform the functions recited by the aforementioned means.

In one configuration, the UE 650 is configured for wireless communication including means for receiving. In one aspect, the receiving means may be the controller/processor 659, memory 660; receive processor 656, modulators 654, antenna 652) configured to perform the functions recited by the receiving means. In another aspect, the aforementioned means may be any module or any apparatus configured to perform the functions recited by the aforementioned means.

Figure 9:
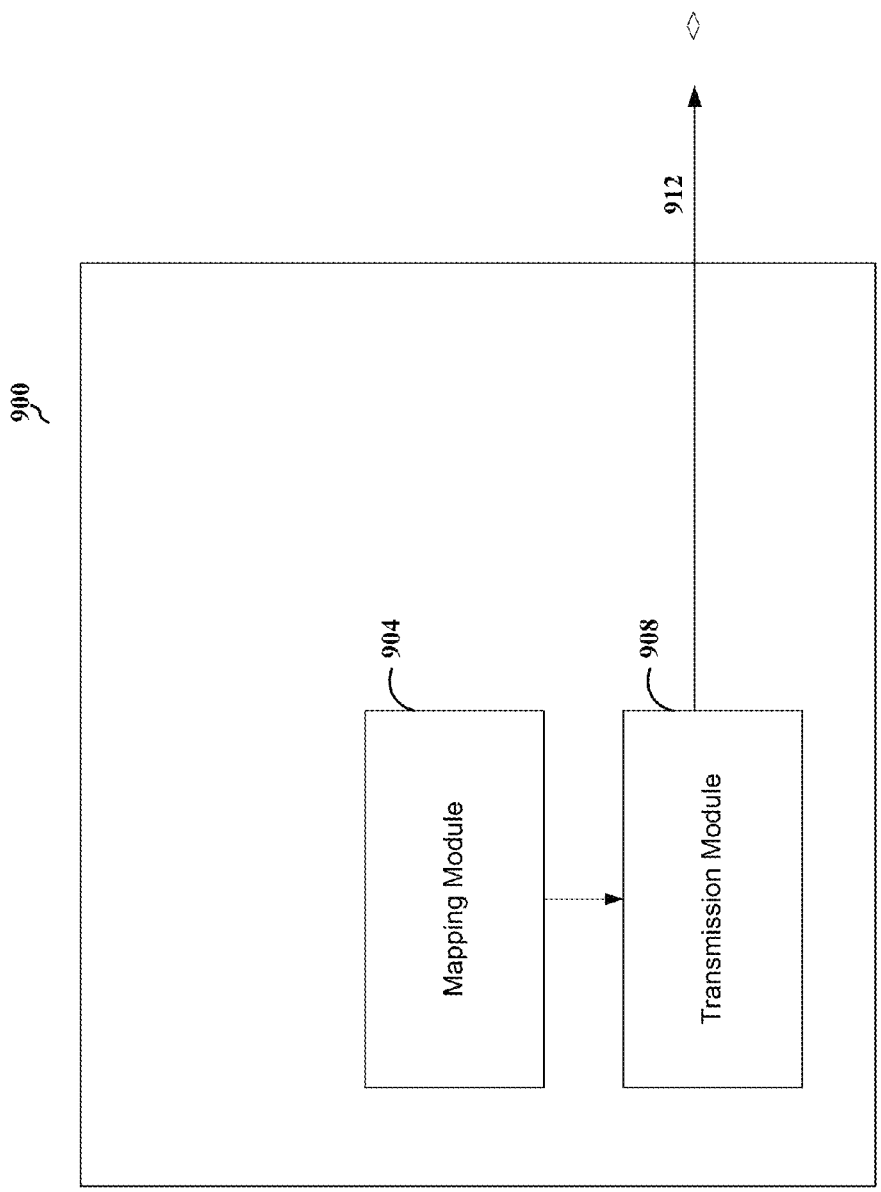
FIG. 9 is a conceptual data flow diagram illustrating the data flow between different modules/means/components in an exemplary apparatus.

FIG. 9 is a conceptual data flow diagram illustrating the data flow between different modules/means/components in an exemplary apparatus 900. The apparatus 900 includes a mapping module 902 that signals a first number of CSI-RS ports corresponding to REs. The mapping module 902 also signals a second number of virtual antenna ports, the second number being less than or equal to the first number. The mapping module 902 transmits the signals via a transmission module 908. The transmission module 908 may transmit the signals from the mapping module via a signal 912. The transmission module 908 may further transmits CSI-RS on each virtual antenna port via the signal 912. The apparatus may include additional modules that perform each of the steps of the algorithm in the aforementioned flow chart FIG. 8A. As such, each step in the aforementioned flow chart FIG. 8A may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 10:
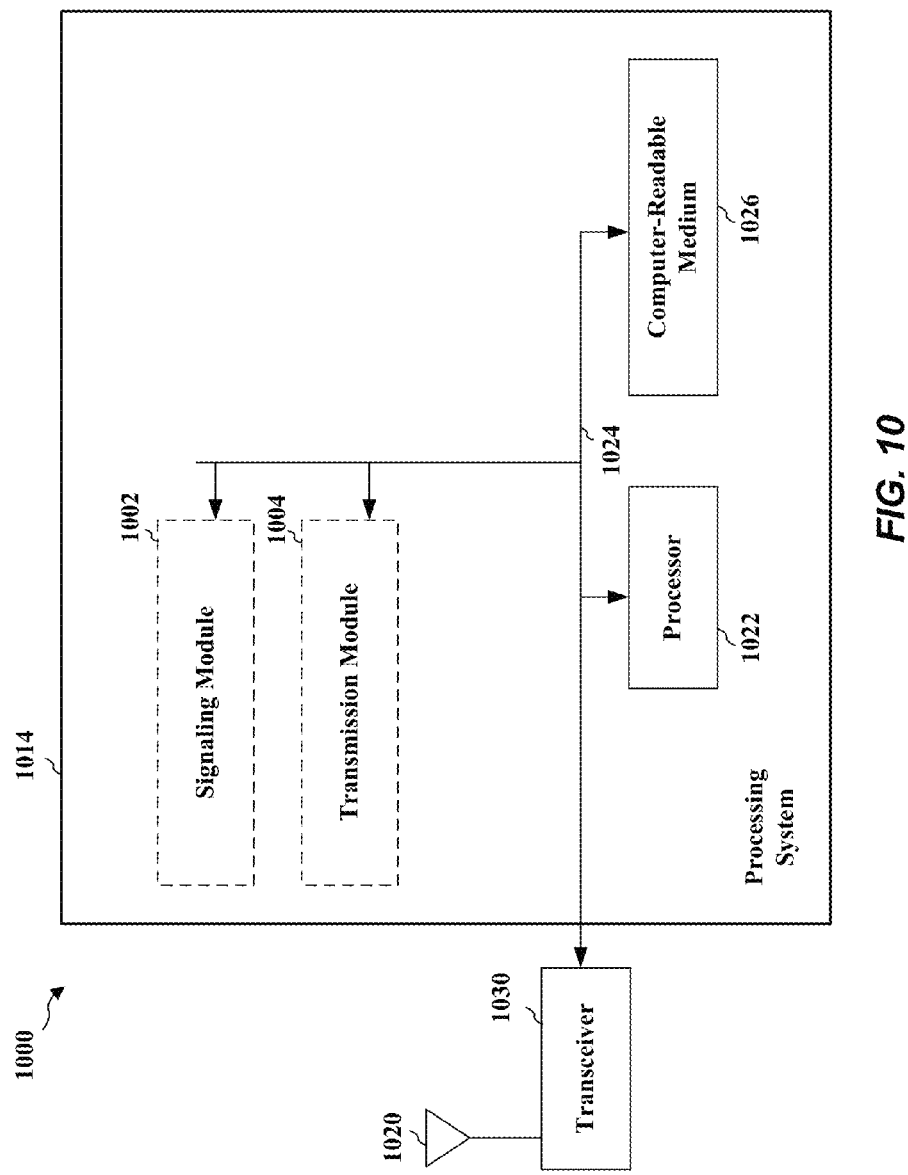
FIG. 10 is a block diagram illustrating different modules/means/components in an exemplary apparatus.

FIG. 10 is a diagram illustrating an example of a hardware implementation for an apparatus 1000 employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware modules, represented by the processor 1022 the modules 1002, 1004, and the computer-readable medium 1026. The bus 1024 may also link various other circuits such as timing sources, peripherals, voltage regulators, and power management circuits, which are well known in the art, and therefore, will not be described any further.

The apparatus includes a processing system 1014 coupled to a transceiver 1030. The transceiver 1030 is coupled to one or more antennas 1020. The transceiver 1030 enables communicating with various other apparatus over a transmission medium. The processing system 1014 includes a processor 1022 coupled to a computer-readable medium 1026. The processor 1022 is responsible for general processing, including the execution of software stored on the computer-readable medium 1026. The software, when executed by the processor 1022, causes the processing system 1014 to perform the various functions described for any particular apparatus. The computer-readable medium 1026 may also be used for storing data that is manipulated by the processor 1022 when executing software.

The processing system 1014 includes a signaling module 1002 for signaling a first number of CSI-RS ports corresponding to REs. The signaling module 1002 also signals a second number of virtual antenna ports, the second number being less than or equal to the first number. The processing system 1014 also includes a transmission module 1004 for transmitting CSI-RS on each virtual antenna port. The modules may be software modules running in the processor 1022, resident/stored in the computer-readable medium 1026, one or more hardware modules coupled to the processor 1022, or some combination thereof The processing system 1014 may be a component of the eNodeB 610 and may include the memory 676, and/or the controller/processor 675.

Figure 11:
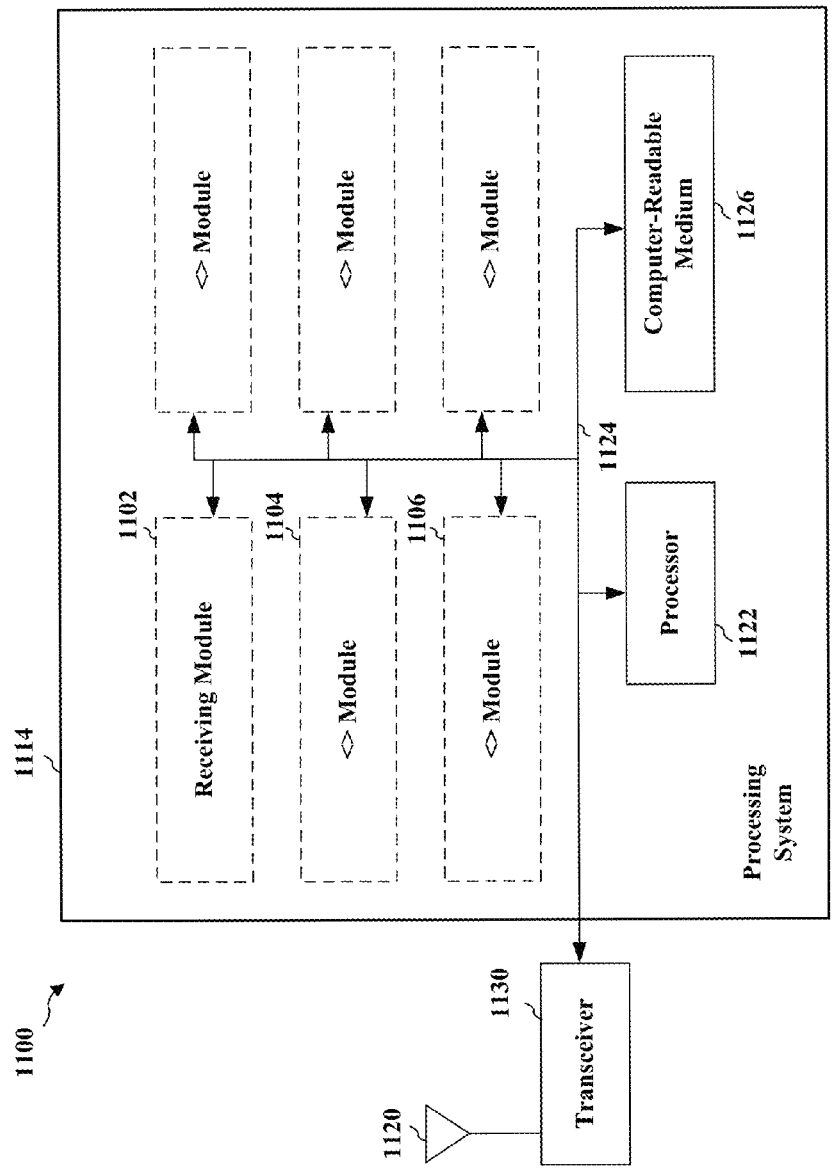
FIG. 11 is a block diagram illustrating different modules/means/components in an exemplary apparatus.

FIG. 11 is a diagram illustrating an example of a hardware implementation for an apparatus 1100 employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware modules, represented by the processor 1122 the modules 1102, 1104, 1106 and the computer-readable medium 1126. The bus 1124 may also link various other circuits such as timing sources, peripherals, voltage regulators, and power management circuits, which are well known in the art, and therefore, will not be described any further.

The apparatus includes a processing system 1114 coupled to a transceiver 1130. The transceiver 1130 is coupled to one or more antennas 1120. The transceiver 1130 enables communicating with various other apparatus over a transmission medium. The processing system 1114 includes a processor 1122 coupled to a computer-readable medium 1126. The processor 1122 is responsible for general processing, including the execution of software stored on the computer-readable medium 1126. The software, when executed by the processor 1122, causes the processing system 1114 to perform the various functions described for any particular apparatus. The computer-readable medium 1126 may also be used for storing data that is manipulated by the processor 1122 when executing software.

The processing system 1114 includes a receiving module 1102 for receiving a first number of CSI-RS ports corresponding to REs. The receiving_ module 1102 also receives a second number of virtual antenna ports, the second number being less than or equal to the first number. The receiving_ module 1102 also receives CSI-RS on each virtual antenna port. The modules may be software modules running in the processor 1122, resident/stored in the computer-readable medium 1126, one or more hardware modules coupled to the processor 1122, or some combination thereof. The processing system 1114 may be a component of the UE 650 and may include the memory 660, and/or the controller/processor 659.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
signaling, to at least one user equipment (UE) compatible with LTE release 10 or higher, a first number of channel state information-reference signal (CSI-RS) ports corresponding to resource elements (REs) of a CSI-RS pattern, the first number of CSI-RS ports being greater than a number of physical antenna ports of a base station;
signaling, to the at least one UE, a second number of virtual antenna ports, the second number being less than or equal to the first number; and
transmitting CSI-RS on each virtual antenna port that is to at least a portion of the Res of the CSI-RS pattern.

2. The method of claim 1, further comprising:
configuring at least one legacy UE with CSI-RS ports matching the second number;
and configuring the at least one legacy UE with a muting pattern based on the second number so that the legacy UE performs measurements on a number of REs allocated based at least in part on at least in part the second number.

3. The method of claim 1, in which the CSI-RS are mapped to at least two REs corresponding to the first number of CSI-RS ports.

4. The method of claim 1, further comprising signaling information for a mapping between the first number of CSI-RS ports and the second number of virtual antenna ports.

5. The method of claim 1, in which the second number is equal to the first number.

6. The method of claim 1, further comprising configuring the at least one advanced UE with the first number of CSI-RS ports in at least transmission modes 1, 2, 3, 4, 5, 6, 7, 8, or a combination thereof.

7. A method of wireless communication, comprising:
receiving, at an advanced user equipment (UE), a first number of channel state information-reference signal (CSI-RS) ports corresponding to resource elements (REs), the first number of CSI-RS ports being matched to a muting pattern for at least one legacy UE;
receiving, at the advanced UE, a second number of virtual antenna ports, the second number being less than or equal to the first number; and
receiving, at the advanced UE, CSI-RS on each virtual antenna port, the CSI-RS mapped to at least a portion of the REs.

8. The method of claim 7, further comprising:
performing a channel estimation and/or interference measurement using the received CSI-RS.

9. The method of claim 8, in which the received CSI-RS are on at least two REs corresponding to the first number of CSI-RS ports.

10. The method of claim 8, further comprising evaluating channel state information (CSI) based at least in part on the channel estimation and/or the interference measurement.

11. The method of claim 10, in which the CSI is evaluated based on measurements of the first number of CSI-RS ports in at least transmission modes 1, 2, 3, 4, 5, 6, 7, 8, or a combination thereof.

12. An apparatus for wireless communication, comprising:
means for signaling, to at least one advanced user equipment (UE), a first number of channel state information-reference signal (CSI-RS) ports corresponding to resource elements (REs);
means for configuring at least one legacy UE with a muting pattern matching the first number of CSI-RS ports;
means for signaling, to the at least one advanced UE, a second number of virtual antenna ports, the second number being less than or equal to the first number; and
means for transmitting CSI-RS on each virtual antenna port, the CSI-RS mapped to at least a portion of the REs.

13. An apparatus for wireless communication, comprising:
means for receiving, at an advanced user equipment (UE), a first number of channel state information-reference signal (CSI-RS) ports corresponding to resource elements (REs), the first number of CSI-RS ports being matched to a muting pattern for at least one legacy UE;
means for receiving, at the advanced UE, a second number of virtual antenna ports, the second number being less than or equal to the first number; and
means for receiving, at the advanced UE, CSI-RS on each virtual antenna port, the CSI-RS mapped to at least a portion of the REs.

14. A computer program product for wireless communication in a wireless network, comprising:
a non-transitory computer-readable medium having non-transitory program code recorded thereon, the program code comprising:
program code to signal, to at least one advanced user equipment (UE), a first number of channel state information-reference signal (CSI-RS) ports corresponding to resource elements (REs);
program code to configure at least one legacy UE with a muting pattern matching the first number of CSI-RS ports;

program code to signal, to the at least one advanced UE, a second number of virtual antenna ports, the second number being less than or equal to the first number; and program code to transmit CSI-RS on each virtual antenna port, the CSI-RS mapped to at least a portion of the REs.

15. A computer program product for wireless communication in a wireless network, comprising:
a non-transitory computer-readable medium having non-transitory program code recorded thereon, the program code comprising:
program code to receive, at an advanced user equipment (UE), a first number of channel state information-reference signal (CSI-RS) ports corresponding to resource elements (REs), the first number of CSI-RS ports being matched to a muting pattern for at least one legacy UE;
program code to receive, at the advanced UE, a second number of virtual antenna ports, the second number being less than or equal to the first number; and
program code to receive, at the advanced UE, CSI-RS on each virtual antenna port, the CSI-RS mapped to at least a portion of the REs.

16. An apparatus for wireless communication, comprising:
a memory; and
at least one processor coupled to the memory, the at least one processor being configured:
to signal, to at least one advanced user equipment (UE), a first number of channel state information-reference signal (CSI-RS) ports corresponding to resource elements (REs);
to configure at least one legacy UE with a muting pattern matching the first number of CSI-RS ports;
to signal, to the at least one advanced UE, a second number of virtual antenna ports, the second number being less than or equal to the first number; and
to transmit CSI-RS on each virtual antenna port, the CSI-RS mapped to at least a portion of the REs.

17. The apparatus of claim 16, in which the at least one processor is further configured:
to configure at least one legacy UE with CSI-RS ports matching the second number;
and to configure the at least one legacy UE with a muting pattern based at least in part on the second number so that the legacy UE performs measurements on a number of REs allocated based at least in part on the second number.

18. The apparatus of claim 16, in which the CSI-RS are mapped to at least two REs corresponding to the first number CSI-RS ports.

19. The apparatus of claim 16, in which the at least one processor is further configured to signal information for a mapping between the first number of CS-RS ports and the second number of virtual antenna ports.

20. The apparatus of claim 16, in which the second number is equal to the first number.

21. The apparatus of claim 16, in which the at least one processor is further configured to configure the at least one advanced UE with the first number of CSI-RS ports in at least transmission modes 1, 2, 3, 4, 5, 6, 7, 8, or a combination thereof.

22. An advanced user equipment (UE) configured for wireless communication, comprising:
a memory; and
at least one processor coupled to the memory, the at least one processor being configured:
to receive a first number of channel state information-reference signal (CSI-RS) ports corresponding to resource elements (REs), the first number of CSI-RS ports being matched to a muting pattern for at least one legacy UE;
to receive a second number of virtual antenna ports, the second number being less than or equal to the first number; and
to receive CSI-RS on each virtual antenna port, the CSI-RS mapped to at least a portion of the REs.

23. The apparatus of claim 22, in which the at least one processor is further configured to perform a channel estimation and/or interference measurement using the received CSI-RS.

24. The apparatus of claim 23, in which the received CSI-RS are on at least two REs corresponding to the first number of CSI-RS ports.

25. The apparatus of claim 23, in which the at least one processor is further configured to evaluate channel state information (CSI) based at least in part on the channel estimation and/or the interference measurement.

26. The apparatus of claim 25, in which the CSI is evaluated based on measurements of the first number of CSI-RS ports in at least transmission modes 1, 2, 3, 4, 5, 6, 7, 8, or a combination thereof.

* * * * *

UNITED STATES PATENT AND TRADEMARK OFFICE
CERTIFICATE OF CORRECTION

PATENT NO.       : 9,025,479 B2                                Page 1 of 4
APPLICATION NO.  : 13/633836
DATED            : May 5, 2015
INVENTOR(S)      : Peter Gaal et al.

It is certified that error appears in the above-identified patent and that said Letters Patent is hereby corrected as shown below:

In the Claims,

Beginning at column 15, line 41 through column 18, line 44 should read as follows:

1. A method of wireless communication, comprising:
   signaling, to at least one advanced user equipment (UE), a first number of channel state information-reference signal (CSI-RS) ports corresponding to CSI-RS resource elements (REs), the first number of CSI-RS ports being greater than a number of physical antenna ports of a base station, and a number of the CSI-RS REs being allocated based at least in part on the first number of CSI-RS ports;
   signaling, to the at least one advanced UE, a second number of virtual antenna ports, the second number being less than or equal to the first number, the CSI-RS REs being mapped to the second number of virtual antenna ports; and
   transmitting CSI-RS on each virtual antenna port that is mapped to at least a portion of the REs.
2. The method of claim 1, further comprising:
   configuring at least one legacy UE with CSI-RS ports matching the second number; and
   configuring the at least one legacy UE with a muting pattern based on the second number so that the legacy UE performs measurements on a number of REs allocated based at least in part on at least in part the second number.
3. The method of claim 1, in which the CSI-RS are mapped to at least two REs corresponding to the first number of CSI-RS ports.
4. The method of claim 1, further comprising signaling information for a mapping between the first number of CSI-RS ports and the second number of virtual antenna ports.
5. The method of claim 1, in which the second number is equal to the first number.
6. The method of claim 1, further comprising configuring the at least one advanced UE with the first number of CSI-RS ports in at least transmission modes 1, 2, 3, 4, 5, 6, 7, 8, or a combination thereof.
7. A method of wireless communication, comprising:
   receiving, at an advanced user equipment (UE), a first number of channel state information-reference signal (CSI-RS) ports corresponding to CSI-RS resource elements (REs), the Signed and Sealed this
Twenty-fourth Day of November, 2015

Michelle K. Lee
*Director of the United States Patent and Trademark Office* first number of CSI-RS ports being greater than a number of physical antenna ports of a base station, and a number of the CSI-RS REs being allocated based at least in part on the first number of CSI-RS ports;

receiving, at the advanced UE, a second number of virtual antenna ports, the second number being less than or equal to the first number, the CSI-RS REs being mapped to the second number of virtual antenna ports; and receiving, at the advanced UE, CSI-RS on each virtual antenna port that is mapped to at least a portion of the CSI-RS REs.

8. The method of claim 7, further comprising:
performing a channel estimation and/or interference measurement using the received CSI-RS.

9. The method of claim 8, in which the received CSI-RS are on at least two REs corresponding to the first number of CSI-RS ports.

10. The method of claim 8, further comprising evaluating channel state information (CSI) based at least in part on the channel estimation and/or the interference measurement.

11. The method of claim 10, in which the CSI is evaluated based on measurements of the first number of CSI-RS ports in at least transmission modes 1, 2, 3, 4, 5, 6, 7, 8, or a combination thereof.

12. An apparatus for wireless communication, comprising:
means for signaling, to at least one advanced user equipment (UE), a first number of channel state information-reference signal (CSI-RS) ports corresponding to CSI-RS resource elements (REs), the first number of CSI-RS ports being greater than a number of physical antenna ports of a base station, and a number of the CSI-RS REs being allocated based at least in part on the first number of CSI-RS ports;

means for signaling, to the at least one advanced UE, a second number of virtual antenna ports, the second number being less than or equal to the first number, the CSI-RS REs being mapped to the second number of virtual antenna ports; and means for transmitting CSI-RS on each virtual antenna port that is mapped to at least a portion of the REs.

13. An apparatus for wireless communication, comprising:
means for receiving, at an advanced user equipment (UE), a first number of channel state information-reference signal (CSI-RS) ports corresponding to CSI-RS resource elements (REs), the first number of CSI-RS ports being greater than a number of physical antenna ports of a base station, and a number of the CSI-RS REs being allocated based at least in part on the first number of CSI-RS ports;

means for receiving, at the advanced UE, a second number of virtual antenna ports, the second number being less than or equal to the first number, the CSI-RS REs being mapped to the second number of virtual antenna ports; and means for receiving, at the advanced UE, CSI-RS on each virtual antenna port, that is mapped to at least a portion of the CSI-RS REs.

14. A computer program product for wireless communication in a wireless network, comprising:
a non-transitory computer-readable medium having non-transitory program code recorded thereon, the program code comprising:

program code to signal, to at least one advanced user equipment (UE), a first number of channel state information-reference signal (CSI-RS) ports corresponding to CSI-RS resource elements (REs), the first number of CSI-RS ports being greater than a number of physical antenna ports of a base station, and a number of the CSI-RS REs being allocated based at least in part on the first number of CSI-RS ports;

program code to configure at least one legacy UE with a muting pattern matching the first number of CSI-RS ports;

program code to signal, to the at least one advanced UE, a second number of virtual antenna ports, the second number being less than or equal to the first number, the CSI-RS REs being mapped to the second number of virtual antenna ports; and program code to transmit CSI-RS on each virtual antenna port that is mapped to at least a portion of the REs.

15. A computer program product for wireless communication in a wireless network, comprising:

a non-transitory computer-readable medium having non-transitory program code recorded thereon, the program code comprising:

program code to receive, at an advanced user equipment (UE), a first number of channel state information-reference signal (CSI-RS) ports corresponding to CSI-RS resource elements (REs), the first number of CSI-RS ports being greater than a number of physical antenna ports of a base station, and a number of the CSI-RS REs being allocated based at least in part on the first number of CSI-RS ports;

program code to receive, at the advanced UE, a second number of virtual antenna ports, the second number being less than or equal to the first number, the CSI-RS REs being mapped to the second number of virtual antenna ports; and program code to receive, at the advanced UE, CSI-RS on each virtual antenna port that is mapped to at least a portion of the CSI-RS REs.

16. An apparatus for wireless communication, comprising:

a memory; and at least one processor coupled to the memory, the at least one processor being configured:

to signal, to at least one advanced user equipment (UE), a first number of channel state information-reference signal (CSI-RS) ports corresponding to CSI-RS resource elements (REs), the first number of CSI-RS ports being greater than a number of physical antenna ports of a base station, and a number of the CSI-RS REs being allocated based at least in part on the first number of CSI-RS ports;

to signal, to the at least one advanced UE, a second number of virtual antenna ports, the second number being less than or equal to the first number, the CSI-RS REs being mapped to the second number of virtual antenna ports; and to transmit CSI-RS on each virtual antenna port that is mapped to at least a portion of the REs.

17. The apparatus of claim 16, in which the at least one processor is further configured:

to configure at least one legacy UE with CSI-RS ports matching the second number; and to configure the at least one legacy UE with a muting pattern based at least in part on the second number so that the legacy UE performs measurements on a number of REs allocated based at least in part on the second number.

18. The apparatus of claim 16, in which the CSI-RS are mapped to at least two REs corresponding to the first number CSI-RS ports.

19. The apparatus of claim 16, in which the at least one processor is further configured to signal information for a mapping between the first number of CS-RS ports and the second number of virtual antenna ports.

20. The apparatus of claim 16, in which the second number is equal to the first number.
21. The apparatus of claim 16, in which the at least one processor is further configured to configure the at least one advanced UE with the first number of CSI-RS ports in at least transmission modes 1, 2, 3, 4, 5, 6, 7, 8, or a combination thereof.
22. An advanced user equipment (UE) configured for wireless communication, comprising:
   a memory; and
   at least one processor coupled to the memory, the at least one processor being configured:
      to receive a first number of channel state information-reference signal (CSI-RS) ports corresponding to CSI-RS resource elements (REs), the first number of CSI-RS ports being greater than a number of physical antenna ports of a base station, and a number of the CSI-RS REs being allocated based at least in part on the first number of CSI-RS ports;
      to receive a second number of virtual antenna ports, the second number being less than or equal to the first number, the CSI-RS REs being mapped to the second number of virtual antenna ports; and
      to receive CSI-RS on each virtual antenna port that is mapped to at least a portion of the REs.
23. The apparatus of claim 22, in which the at least one processor is further configured to perform a channel estimation and/or interference measurement using the received CSI-RS.
24. The apparatus of claim 23, in which the received CSI-RS are on at least two REs corresponding to the first number of CSI-RS ports.
25. The apparatus of claim 23, in which the at least one processor is further configured to evaluate channel state information (CSI) based at least in part on the channel estimation and/or the interference measurement.
26. The apparatus of claim 25, in which the CSI is evaluated based on measurements of the first number of CSI-RS ports in at least transmission modes 1, 2, 3, 4, 5, 6, 7, 8, or a combination thereof.